(No Model.)

C. W. McCORMICK.
NUT LOCK.

No. 490,585. Patented Jan. 24, 1893.

Witnesses
Louis T. Julihn
E. G. Julihn

Inventor
C. W. McCormick
By Hopkins & Atkins
Attorneys

UNITED STATES PATENT OFFICE.

CHARLES W. McCORMICK, OF EMPORIA, KANSAS.

NUT-LOCK.

SPECIFICATION forming part of Letters Patent No. 490,585, dated January 24, 1893.

Application filed June 16, 1892. Serial No. 436,893. (No model.)

*To all whom it may concern:*

Be it known that I, CHARLES W. McCORMICK, of Emporia, county of Lyon, and State of Kansas, have invented certain new and useful Improvements in Nut-Locks, of which the following is a specification, reference being had to the accompanying drawings, in which—

Figure 1:
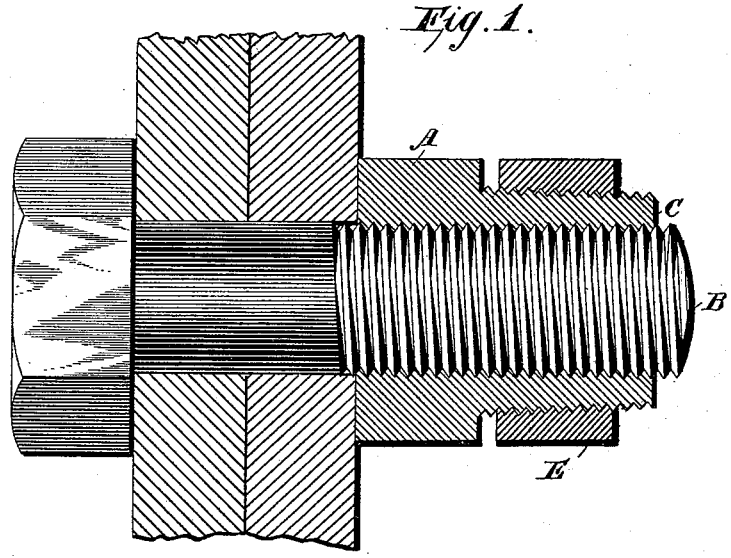
Figure 2:
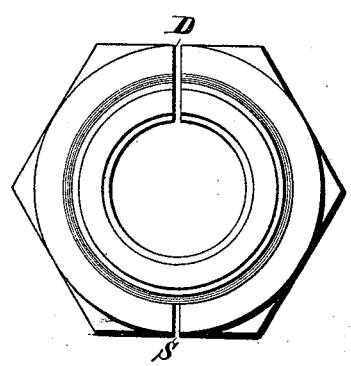
Figure 3:
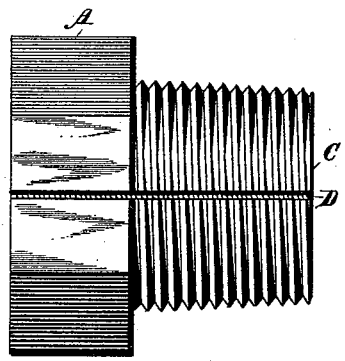

Figure 1 is a view of a bolt with a nut and lock thereon in vertical central section. Fig. 2 is a top plan view of the lock and Fig. 3 a side elevation of the same.

The object of my invention is to produce a nut-lock in which a screw-threaded nut constitutes the lock, so that it may be applied by the same wrench which is used to apply the nut.

Referring to the letters upon the drawings, A indicates a nut interiorly threaded, as usual, to fit a bolt B correspondingly externally threaded. This nut is provided with a tube C projecting outwardly from it, and preferably formed integrally with it. This tube is interiorly threaded like the nut, and both the tube and nut are slitted at D. The slit extends entirely through one side of the nut and tube. The tube is tapered externally and threaded. The lock-nut E is threaded internally and tapered to correspond with the taper of the tube. The nut is applied in the usual way, and then the lock is applied upon the tube and screwed on hard, so that the tube and nut are compressed firmly upon the bolt and cannot unscrew; or the lock may be first screwed on to the tube and then the nut screwed to place, after which the lock can be screwed on further to clamp the tube and nut, as already described.

S indicates a slot in one side of the nut, preferably opposite the slit D. The object of this slot is to weaken the nut at that point, so that it can be more readily and evenly clamped upon the bolt by the lock.

More than one slot may be used if desired. In small nuts no slot will be necessary; but in large nuts one or more should be employed, in order that the nut may be effectually clamped upon the bolt by the lock.

The lock itself is prevented from unscrewing by the tendency of the tube and nut to expand, and the great strain thus produced unites the lock, tube, and bolt almost as firmly as if they were of one piece of metal.

In my device all of the threads of the tube and nut are alike forced into engagement with the threads of the bolt, and the whole force of tendency to expand in the tube and in the nut conjoins to unite the external threads of the tube with the clamp, or lock.

According to the physical law that action and reaction are equal in opposite directions, the tighter the lock is screwed up to clamp the tube, nut, and bolt, the greater the pressure upon the contact surfaces of the lock nut, tube, and bolt. In addition to the intense strain and perfect contact at all points caused by the power of a wrench, the tendency of the nut and tube to expand increases by that much the security and immobility of the connection between the lock and the tube.

What I claim is:—

1. A nut provided with a tube externally tapered and threaded, the tube and nut being slitted entirely through on one side, substantially as set forth.

2. A nut provided with a tube externally tapered and threaded, the tube and nut being slitted entirely through on one side, in combination with a tapered clamp nut, substantially as set forth.

3. A nut provided with a tube externally tapered and threaded, the tube and nut being slitted entirely through on one side, and the nut being slotted on another side, substantially as set forth.

In testimony of all which I have hereunto unto subscribed my name.

CHARLES W. McCORMICK.

Witnesses:
 JOSEPH L. ATKINS,
 C. P. ELWELL.